(12) United States Patent
Wilson et al.

(10) Patent No.: US 10,279,548 B2
(45) Date of Patent: May 7, 2019

(54) METHODS AND PRECURSORS FOR MANUFACTURING A PERFORATED COMPOSITE PART

(71) Applicant: Short Brothers PLC, Belfast (GB)

(72) Inventors: Robert Samuel Wilson, Belfast (GB); Tony Millar, Belfast (GB)

(73) Assignee: SHORT BROTHERS PLC, Belfast (IE)

( * ) Notice: Subject to any disclaimer, the term of this patent is extended or adjusted under 35 U.S.C. 154(b) by 0 days.

(21) Appl. No.: 15/523,991

(22) PCT Filed: Nov. 2, 2015

(86) PCT No.: PCT/GB2015/053290
§ 371 (c)(1),
(2) Date: May 3, 2017

(87) PCT Pub. No.: WO2016/071676
PCT Pub. Date: May 12, 2016

(65) Prior Publication Data
US 2017/0334153 A1 Nov. 23, 2017

(30) Foreign Application Priority Data
Nov. 3, 2014 (GB) .................................. 1419529.1

(51) Int. Cl.
*B29C 70/54* (2006.01)
*B32B 5/06* (2006.01)
(Continued)

(52) U.S. Cl.
CPC ........ *B29C 70/545* (2013.01); *B02C 19/0056* (2013.01); *B32B 3/12* (2013.01);
(Continued)

(58) Field of Classification Search
CPC ..................................................... B29C 70/545
(Continued)

(56) References Cited

U.S. PATENT DOCUMENTS 4,218,276 A 8/1980 King
4,288,679 A 9/1981 La Rocca
(Continued)

FOREIGN PATENT DOCUMENTS

CN 102667916 A 9/2012
CN 103031566 4/2013
(Continued)

OTHER PUBLICATIONS

International Search Report for corresponding application PCT/GB2015/053290 filed Nov. 2, 2015; dated Jan. 19, 2016.
(Continued)

*Primary Examiner* — Brent T O'Hern
(74) *Attorney, Agent, or Firm* — Cantor Colburn LLP (57) ABSTRACT

Precursors and methods for manufacturing perforated composite parts are disclosed. An exemplary precursor (19) comprises structural fibers (24,28) embedded in a cured matrix material (24,26) and interposed between two removable plies (20). The precursor may also comprise a sacrificial fiber (28) extending through the removable plies (20), the matrix material (24,26) and between the structural fibers (24,28). An exemplary method comprises removing the removable plies (20) from the precursor (19) and removing the sacrificial fiber (28) from the precursor after removing the removable plies to form a through hole in the precursor (19) at a location of the sacrificial fiber (28).

15 Claims, 10 Drawing Sheets

(51) Int. Cl.

| | | |
|---|---|---|
| *B32B 7/08* | (2019.01) | |
| *B32B 5/02* | (2006.01) | |
| *B32B 5/22* | (2006.01) | |
| *B32B 5/24* | (2006.01) | |
| *B32B 5/26* | (2006.01) | |
| *B32B 7/06* | (2019.01) | |
| *B32B 3/12* | (2006.01) | |
| *B32B 3/26* | (2006.01) | |
| *B02C 19/00* | (2006.01) | |
| *B32B 38/10* | (2006.01) | |

(52) U.S. Cl.
CPC .............. *B32B 3/266* (2013.01); *B32B 5/02* (2013.01); *B32B 5/024* (2013.01); *B32B 5/06* (2013.01); *B32B 5/22* (2013.01); *B32B 5/24* (2013.01); *B32B 5/26* (2013.01); *B32B 7/06* (2013.01); *B32B 7/08* (2013.01); *B32B 38/10* (2013.01); *B32B 2250/20* (2013.01); *B32B 2255/02* (2013.01); *B32B 2255/26* (2013.01); *B32B 2260/021* (2013.01); *B32B 2260/046* (2013.01); *B32B 2262/02* (2013.01); *B32B 2262/0223* (2013.01); *B32B 2262/0246* (2013.01); *B32B 2262/0276* (2013.01); *B32B 2262/06* (2013.01); *B32B 2262/08* (2013.01); *B32B 2262/101* (2013.01); *B32B 2307/102* (2013.01); *B32B 2307/7166* (2013.01); *B32B 2307/724* (2013.01); *B32B 2367/00* (2013.01); *B32B 2386/00* (2013.01); *B32B 2605/00* (2013.01); *B32B 2605/08* (2013.01); *B32B 2605/10* (2013.01); *B32B 2605/18* (2013.01)

(58) Field of Classification Search
USPC .......................................................... 428/98
See application file for complete search history.

(56) References Cited

U.S. PATENT DOCUMENTS

| | | | |
|---|---|---|---|
| 4,421,811 A | 12/1983 | Rose | |
| 4,433,021 A | 2/1984 | Riel | |
| 4,465,725 A | 8/1984 | Riel | |
| 4,671,841 A | 6/1987 | Stephens | |
| 4,990,391 A | 2/1991 | Veta | |
| 5,490,602 A | 2/1996 | Wilson | |
| 5,543,198 A | 9/1996 | Wilson | |
| 5,841,079 A | 11/1998 | Parente | |
| 6,179,086 B1 | 1/2001 | Bansemir | |
| 6,182,787 B1 | 2/2001 | Kraft | |
| 6,830,796 B2 | 12/2004 | Murray | |
| 7,153,464 B2 | 12/2006 | Millard | |
| 7,291,815 B2 | 11/2007 | Hubert | |
| 7,434,659 B2 | 10/2008 | Ayle | |
| 7,510,052 B2 | 3/2009 | Ayle | |
| 7,832,983 B2 | 11/2010 | Kruckenberg | |
| 7,837,150 B2 | 11/2010 | Zecca | |
| 7,854,298 B2 | 12/2010 | Ayle | |
| 7,866,609 B2 | 1/2011 | Parikh | |
| 7,886,488 B2 | 2/2011 | Payne | |
| 7,923,668 B2 | 4/2011 | Layland | |
| 8,047,329 B1 | 11/2011 | Douglas | |
| 8,066,098 B2 | 11/2011 | Ayle | |
| 8,079,443 B2 | 12/2011 | Keller | |
| 8,083,027 B2 | 12/2011 | Holmgren | |
| 8,230,969 B2 | 7/2012 | Frederick | |
| 8,235,171 B2 | 8/2012 | Douglas | |
| 8,245,815 B2 | 8/2012 | Valleroy | |
| 8,387,747 B2 | 3/2013 | Koike | |
| 8,397,865 B2 | 3/2013 | Douglas | |
| 8,413,761 B2 | 4/2013 | Ayle | |
| 8,453,793 B1 | 6/2013 | Franzoi | |
| 8,561,934 B2 | 10/2013 | Kruckenburg | |
| 8,651,233 B2 | 2/2014 | Ayle | |
| 8,721,959 B2 | 5/2014 | Dry | |
| 8,727,072 B2 | 5/2014 | Ayle | |
| 8,752,279 B2 | 6/2014 | Brittingham | |
| 8,756,909 B2 | 6/2014 | Avery | |
| 2011/0016845 A1 | 1/2011 | Silva | |
| 2011/0266088 A1 | 11/2011 | Koike | |
| 2011/0284319 A1 | 11/2011 | Frederick | |
| 2012/0037449 A1 | 2/2012 | Ayle | |
| 2013/0026866 A1 | 1/2013 | Morisaki | |
| 2013/0065042 A1 | 3/2013 | Esser-Kahn | |
| 2013/0189888 A1 | 7/2013 | Patrick | |
| 2013/0341119 A1 | 12/2013 | Ichihashi | |
| 2014/0162519 A1 | 6/2014 | Dong | |

FOREIGN PATENT DOCUMENTS

| | | | |
|---|---|---|---|
| EP | 0361796 | 9/1989 | |
| EP | 0824066 | 2/1998 | |
| EP | 2415584 | 2/2012 | |
| EP | 2495044 | 9/2012 | |
| GB | 1237397 | 6/1971 | |
| GB | 1274871 | 5/1972 | |
| GB | 1420929 | 1/1976 | |
| GB | 1490923 | 12/1977 | |
| GB | 2056367 | 3/1981 | |
| GB | 2122540 | 1/1984 | |
| GB | 2252076 | 7/1992 | |
| GB | 2314526 | 1/1998 | |
| GB | 2349445 | 11/2000 | |
| GB | 2364366 | 1/2002 | |
| GB | 2404966 | 2/2005 | |
| GB | 2404966 A * | 2/2005 | ............... B32B 3/12 |
| JP | H02169230 | 6/1990 | |
| JP | 2001262772 | 9/2001 | |
| WO | 9322128 | 11/1993 | |
| WO | 02057527 | 7/2002 | |

OTHER PUBLICATIONS

Search Report for corresponding application GB1419529.1; Report dated Jun. 2, 2015.
Written Opinion for corresponding application PCT/GB2015/053290 filed Nov. 2, 2015; dated Jan. 19, 2016.
Trevor Young, et al., "Durability of hybrid laminar flow control (HLFC) surfaces", URL: http://www.researchgate.net/publication/239344340, Aerospace Science and Technology 7 (2003) 181-190.
Chinese Office Action for corresponding application 201580059773.X; Report dated Aug. 21, 2018.

* cited by examiner

METHODS AND PRECURSORS FOR MANUFACTURING A PERFORATED COMPOSITE PART

CROSS REFERENCE TO RELATED APPLICATION AND CLAIM OF PRIORITY

The present application claims priority from GB patent application no. GB 1419529.1 filed on 3 Nov. 2014.

TECHNICAL FIELD

The disclosure relates generally to manufacturing composite parts, and more particularly to manufacturing parts such as composite facing sheets of acoustic attenuation devices using sacrificial fibres.

BACKGROUND OF THE ART

Reducing aircraft noise is important to the growth of air transport and for improving the quality of life of people living near airports. The noise associated with an aircraft can be produced from various sources on the aircraft and by various mechanisms. For example, a fan of a turbofan aircraft engine can be a dominant source of noise during take-off and landing of an aircraft having modern high-bypass ratio turbofan aircraft engines.

The use of noise attenuating devices inside aircraft engines is known. Existing noise attenuating devices can be designed to achieve a desired acoustic performance. However, designing and manufacturing such noise attenuating devices to the specifications required to achieve the desired acoustic performance can be difficult, time-consuming and expensive.

Improvement is therefore desirable.

SUMMARY

In one aspect, the disclosure describes a method for manufacturing a perforated composite part. The method comprises:
producing a precursor comprising structural fibres embedded in a cured matrix material and interposed between two removable plies, the precursor also comprising a sacrificial fibre extending through the removable plies, the matrix material and between the structural fibres;
removing at least one of the removable plies from the precursor; and
removing the sacrificial fibre from the precursor after removing the at least one of the removable plies to form a through hole in the precursor at a location of the sacrificial fibre.

Removing the sacrificial fibre may comprise causing the sacrificial fibre to disintegrate.

Removing at least one of the removable plies may cause an end of the sacrificial fibre to become exposed to facilitate disintegration of the sacrificial fibre.

Removing at least one of the removable plies may cause severing of the sacrificial fibre.

The method may comprise removing the sacrificial fibre after removing both of the removable plies.

Removing the sacrificial fibre may comprise causing evaporation of the sacrificial fibre.

The sacrificial fibre may comprise a thermoplastic aliphatic polyester.

The sacrificial fibre may comprise a polylactide (PLA).

Removing the sacrificial fibre may comprise causing dissolution of the sacrificial fibre.

The sacrificial fibre may comprise one of: polyacrylamides, polyacrylates, acrylamide-dimethylaminoethyl acrylate copolymers, polyamines, polyethyleneimines, polyamidoamines and polyethylene oxide.

The sacrificial fibre may comprise one of: water soluble polyethylene oxide, hydrolysed cellulose acetate and polyvinyl alcohol.

The sacrificial fibre may be coated with an agent that hinders a chemical reaction between the sacrificial fibre and the matrix material.

The structural fibres may be part of a non-crimp fabric.

The removable plies may comprise a polytetrafluoroethylene-coated fibreglass fabric.

The method may comprise peeling the removable plies from the precursor to cause severing of the sacrificial fibre.

In another aspect, the disclosure describes a method of manufacturing a perforated composite part using a precursor comprising structural fibres embedded in a cured matrix material and interposed between two removable plies where the precursor also comprises a sacrificial fibre extending through the removable plies, the matrix material and between the structural fibres. The method comprises:
removing the removable plies from the precursor; and
removing the sacrificial fibre from the precursor after removing the removable plies to form a through hole in the precursor at a location of the sacrificial fibre.

Removing the sacrificial fibre may comprise causing the sacrificial fibre to disintegrate.

Removing the removable plies may cause ends of the sacrificial fibre to become exposed to facilitate disintegration of the sacrificial fibre.

Removing the removable plies may cause severing of the sacrificial fibre.

Removing the sacrificial fibre may comprise causing evaporation of the sacrificial fibre.

Removing the sacrificial fibre may comprise causing dissolution of the sacrificial fibre.

The method may comprise peeling the removable plies from the precursor to cause severing of the sacrificial fibre.

In a further aspect, the disclosure describes a precursor for manufacturing a perforated composite part. The precursor comprises:
a layup having a first face and an opposite second face, the layup comprising structural fibres embedded in a cured matrix material and interposed between the first face and the second face; and
a sacrificial fibre extending through the layup and through the first face and the second face of the layup, the sacrificial fibre being removable from the layup in order to form a through hole in the layup at a location of the sacrificial fibre; and
a fibre severing member removably attached to the layup and configured to sever the sacrificial fibre upon removal of the fibre severing member from the layup.

The fibre severing member may comprise a first removable outer ply disposed against the first face of the layup. The precursor may comprise a second removable outer ply disposed against the second face of the layup.

The fibre severing member may be configured to not chemically bond with the matrix material.

The fibre severing member may comprise a polytetrafluoroethylene-coated fibreglass fabric.

The sacrificial fibre may be coated with an agent that hinders a chemical reaction between the sacrificial fibre and the matrix material.

The structural fibres may be part of a non-crimp fabric.

The sacrificial fibre may be configured to evaporate at a temperature that is not otherwise detrimental to the structural fibres or to the matrix material.

The sacrificial fibre may comprise a thermoplastic aliphatic polyester.

The sacrificial fibre may comprise a polylactide (PLA).

The sacrificial fibre may be configured to be dissolved using a solvent that is not otherwise detrimental to the structural fibres or to the matrix material.

The sacrificial fibre may be water-soluble.

The sacrificial fibre may comprise one of: polyacrylamides, polyacrylates, acrylamide-dimethylaminoethyl acrylate copolymers, polyamines, polyethyleneimines, polyamidoamines and polyethylene oxide.

The sacrificial fibre may comprise one of: water soluble poly(ethylene oxide), hydrolysed cellulose acetate and polyvinyl alcohol.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Aspects of various embodiments are described through reference to the drawings.

The present disclosure relates to manufacturing of perforated composite parts. Such composite parts may, for example, be part of noise attenuating devices sometimes referred to as "acoustic liners" or "acoustic panels" for aircraft and other applications. In various aspects, the present disclosure relates to manufacturing parts such as perforated facing sheets of noise attenuating devices that comprise composite materials including carbon fibre, glass fibre and/or natural fibre reinforced structures. Noise attenuating devices such as those referenced herein may be suitable for use in aircraft engines, passenger cabins of aircraft, trains, trucks or other vehicles, structural framework/bodies of aircraft and other vehicles, and in industrial/civil or other applications requiring noise attenuation.

In some embodiments, the manufacturing of perforated composite parts such as facing sheets for noise attenuating devices may comprise the use of sacrificial fibre(s) inserted in composite precursors and subsequently removed to form one or more holes in the composite parts. The removal of the sacrificial fibres may, for example, comprise mechanically withdrawing the sacrificial fibres or causing the sacrificial fibres to disintegrate. The use of sacrificial fibres for forming holes in perforated facing sheets may have advantages over conventional hole forming methods (e.g., mechanical drilling, laser drilling, grit blasting of a masked laminate).

For example, in some embodiments, the use of sacrificial fibres may result in comparatively stronger composite parts because the holes do not cut through (i.e., intersect, damage) the structural fibres of the parts, which could otherwise occur using other conventional drilling methods. Also, the avoidance of damage to the structural fibres may also reduce the risk of exposing cut sections of the structural fibres to moisture and thereby reduce the risk of fluid ingress and delamination. Further, in contrast with some laser drilling methods, the use of sacrificial fibres as described herein may not cause significant heat affected zones and local delamination around the holes produced in the parts. These and other advantages will be apparent from the following description.

Figure 1:
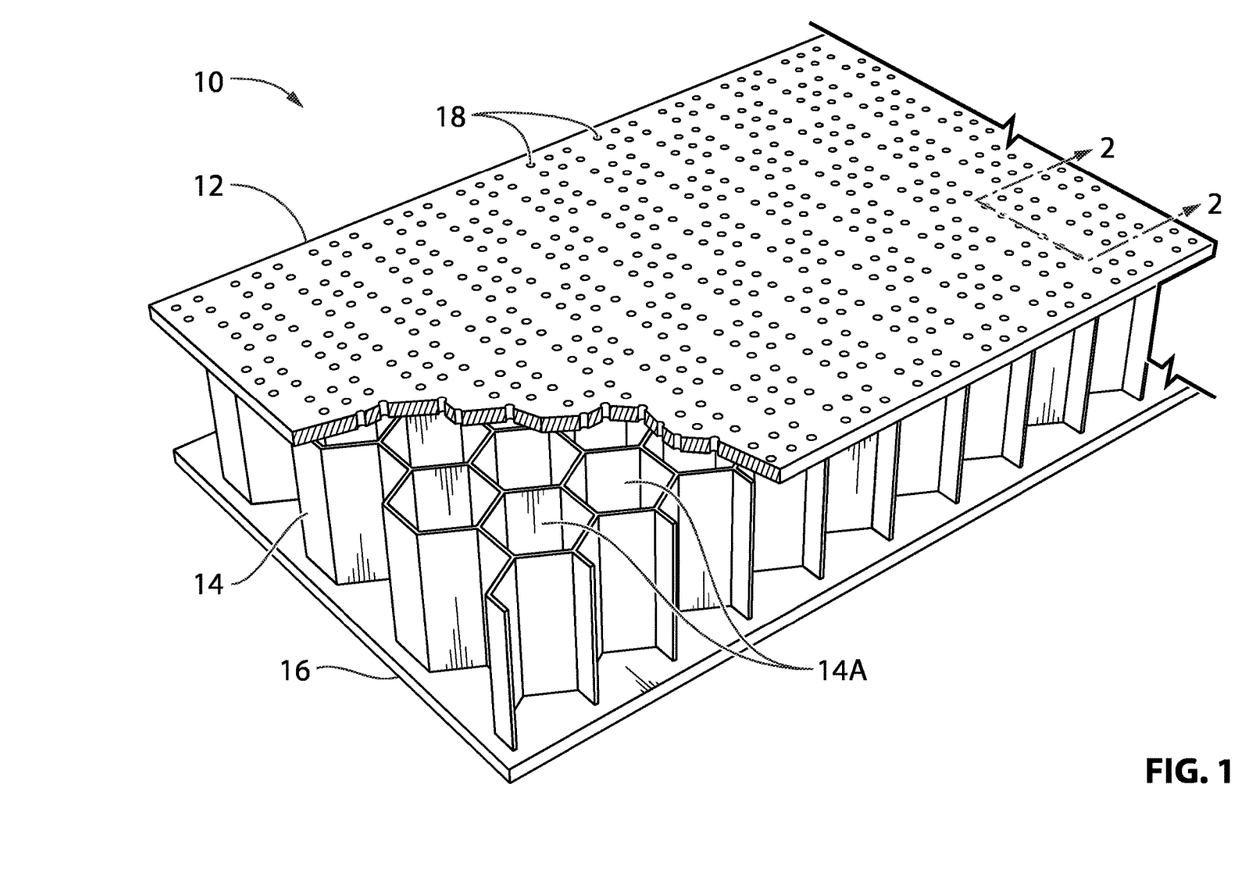
FIG. 1 is a partial axonometric view including a cutaway portion of an exemplary noise attenuating device.

FIG. 1 is a partial axonometric view including a cutaway portion of an exemplary noise attenuating device 10 according to the present disclosure. Noise attenuating device 10 may comprise one or more perforated facing sheets 12 (referred hereinafter as "facing sheet 12"), one or more honeycomb or other cellular cores 14 (referred hereinafter as "cellular core 14") and one or more sound reflecting backing plates 16 (referred hereinafter as "backing plate 16"). Cellular core 14 may be bonded between facing sheet 12 and backing plate 16. Cellular core 14 may partition the space between facing sheet 12 and backing plate 16 into a plurality of parallel cells 14A. Facing sheet 12 may comprise one or more holes 18 extending therethrough. The number, size, shape and spacing of holes 18 may be selected according to known or other methods to establish desired acoustic performance. In some embodiments, the holes 18 may be specified so that between about 5% to about 12% of the surface area of facing sheet 12 is perforated. In some embodiments, the holes 18 may be selected so that between about 4% to about 10% of the surface area of facing sheet 12 is perforated. In some embodiments, the holes 18 may be selected so that between about 5% to about 20% of the surface area of facing sheet 12 is perforated. In some embodiments, backing plate 16 may also be perforated to allow the passage of heated air for anti-icing purposes.

During use, facing sheet 12 may be facing a source of noise and attenuation of the sound waves that impinge facing sheet 12 may occur according to a number of mechanism such as: energy loss due to friction when the sound waves penetrate facing sheet 12 through holes 18; pressure loss when the sound waves expand into cells 14A; and reactive cancellation of a sound wave entering and travelling in cell 14A by a previous sound wave that has been reflected and is returning from backing plate 16. In some embodiments, the depth of cells 14A (i.e., thickness of core 14) may be selected (i.e., tuned) to attenuate a desired frequency or range of frequencies. Since a plurality of holes 18 may be in communication with each of cells 14A, cells 14A may function as a Helmholtz resonant cavity.

Noise attenuating devices having the construction shown in FIG. 1 may be suitable for use in aircraft engines. For example, noise attenuating device 10 may be suitable for installation in a nacelle or other part of an aircraft engine. For example, noise attenuating device 10 may be disposed in selected positions within flow ducts of an aircraft engine. Such flow duct(s) may comprise the inlet duct, fan duct and/or the nozzle assembly of a nacelle. For example, noise attenuating device 10 may be used as a lip acoustic liner/panel or an inlet acoustic liner/panel. Noise attenuating device 10 may be part of a single-piece or multi-piece acoustic liner/panel having a generally linear or curved configuration. For example noise attenuating device 10 may be part of a single-piece or a multi-piece annular-shaped acoustic liner/panel for installation into a nacelle of an aircraft engine and comprising a noise attenuation region that extends substantially 360 degrees about a central axis.

Noise attenuating device 10 shown in FIG. 1 may comprise a single degree of freedom (hereinafter "SDOF") acoustic liner/panel but aspects of the present application are equally applicable to double degree of freedom (hereinafter "2DOF") acoustic liners/panels not specifically shown herein. For example in a 2DOF acoustic liner/panel, perforated facing sheet 12 may be backed by two layers of cellular separator 14 that are separated from each other via a perforated septum sheet (not shown).

The acoustic performance of noise attenuating device 10 may be highly dependent on its construction including the specification of holes 18 and also on the depth of cells 14A in cellular separator 14. Generally, noise attenuating devices of the types referenced herein can be designed to be most effective to reduce the effective perceived noise level and accordingly the thickness of the cellular separator 14 (i.e., the space between facing sheet 12 and backing plate 16) may be about 1-2 inches (25-50 mm).

Figure 2A:
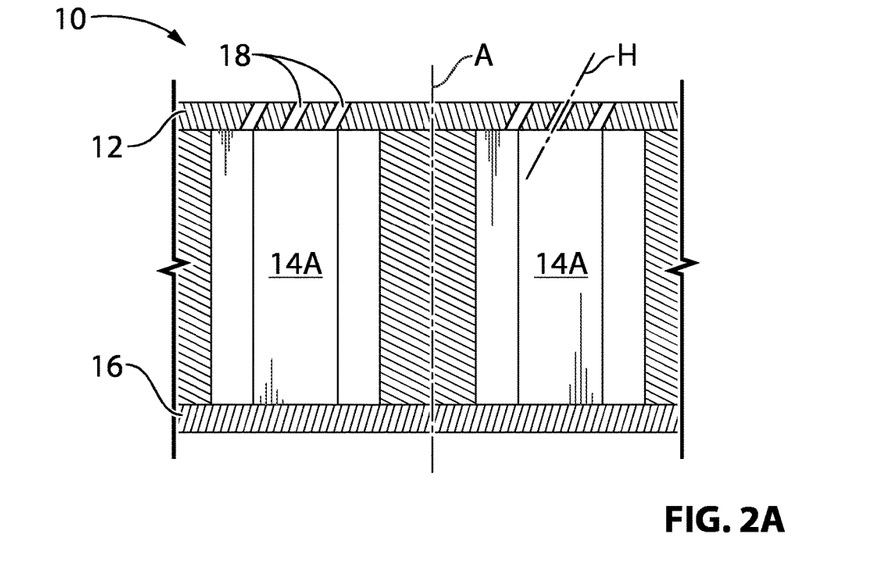
FIG. 2A is a partial cross-sectional view of the noise attenuating device of FIG. 1 taken along line 2-2 of FIG. 1 showing exemplary holes through a composite perforated facing sheet of the device according to one embodiment.

FIG. 2A is a partial cross-sectional view of noise attenuating device 10 taken along line 2-2 of FIG. 1 showing exemplary holes 18 extending through facing sheet 12 of device 10 at an angle to normal axis "A" of facing sheet 12. An axis of one of the holes 18 is illustrated and labelled as "H".

Figure 2B:
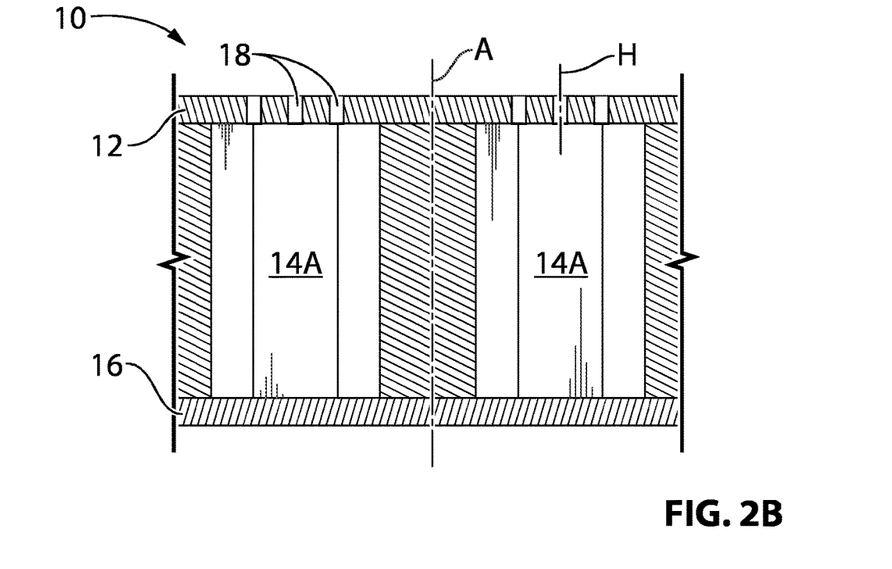
FIG. 2B is a partial cross-sectional view of the noise attenuating device of FIG. 1 taken along line 2-2 of FIG. 1 showing other exemplary holes through the composite perforated facing sheet of the device according to another embodiment.

FIG. 2B is a partial cross-sectional view of noise attenuating device 10 taken along line 2-2 of FIG. 1 showing exemplary holes 18 extending through facing sheet 12 of device 10 and having an axis "H" substantially parallel to normal axis "A" of facing sheet 12.

Figure 3:
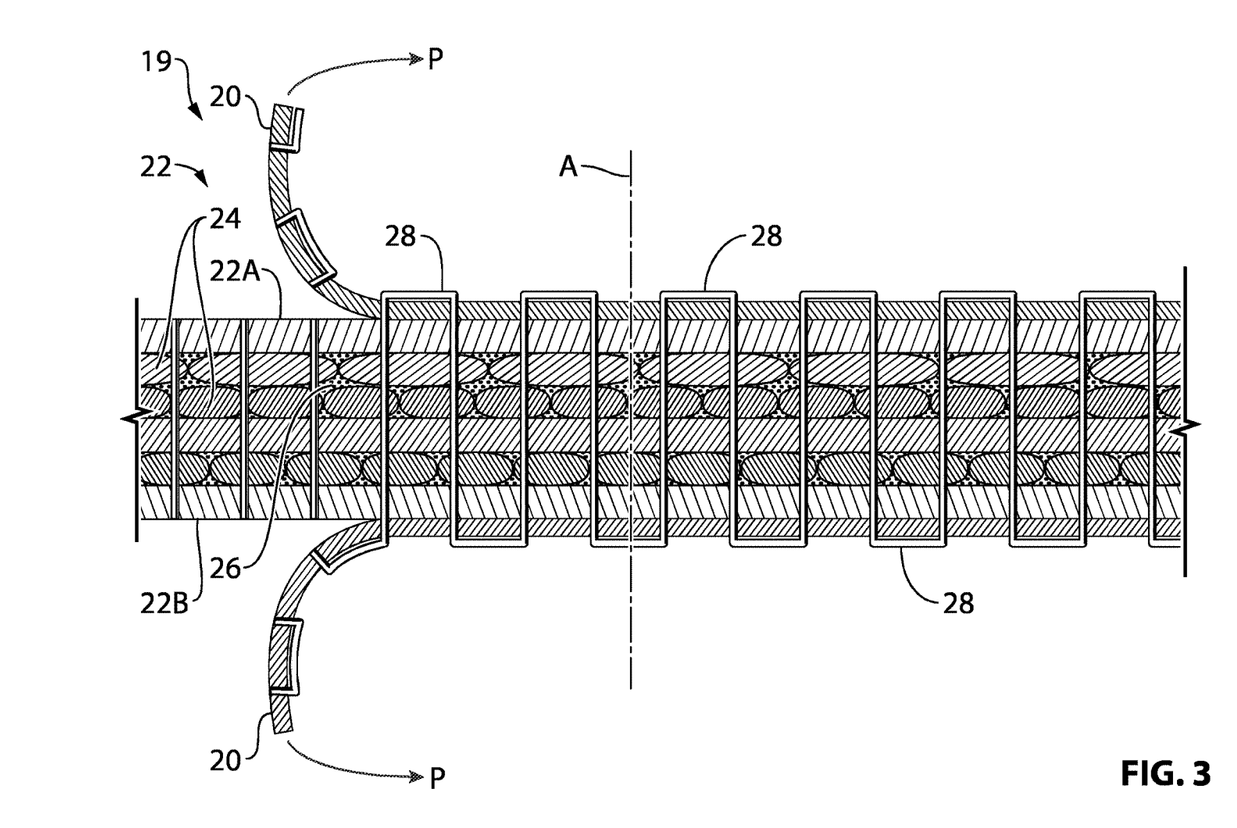
FIG. 3 is a schematic cross-sectional representation of an exemplary precursor used in the manufacturing of the perforated composite facing sheet of the noise attenuating device of FIG. 1.

FIG. 3 is a schematic cross-sectional representation of an exemplary precursor 19 used in the manufacturing of perforated facing sheet 12 of noise attenuating device 10. Precursor 19 may comprise a preform including structural fibres 24 infused with matrix material 26 that has been partially or fully cured. Even though the present disclosure is mainly directed to the manufacturing of perforated facing sheet 12, it is understood that precursor 19 and the methods disclosed herein may be used to manufacture other perforated composite parts having a fibre-reinforced structure. Accordingly, references made herein to facing sheet 12 are intended to be non-limiting. Precursor 19 may have a sheet configuration and normal axis "A" as illustrated. Precursor 19 may comprise two removable outer plies 20, a layup 22 of structural fibres 24 embedded in a partially or fully cured matrix material 26 and interposed between removable plies 20. Precursor 19 may also comprise one or more sacrificial fibres 28 (referred hereinafter as "sacrificial fibre 28") extending through removable plies 20, matrix material 26 and between structural fibres 24. In some embodiments, a relatively thin release film may be applied between one or both removable plies 20 and layup 22 (e.g., between faces 22A, 22B and their respective removable plies 20). The use of such release film may be beneficial in cases where a smoother surface is desired at faces 22A and/or 22B.

The term "precursor" as used herein is intended to encompass a component or an assembly of components that is used in the manufacturing of a final composite part such as facing sheet 12 but that is at a (e.g., pre-final) stage in the manufacturing process that precedes the final composite part. For example, precursor 19 may comprise a preform or laminate of the final composite part. For example, precursor 19 may comprise dry layers of structural fibres 24 (e.g., woven or non-crimp fabrics), dry layers of structural fibres 24 with sacrificial fibre 28 inserted therebetween, layup 22 of structural fibres 24 and sacrificial fibre 28 infused with matrix material 26 that has been partially or fully cured, layup 22 of structural fibres 24 and sacrificial fibre 28 embedded in cured matrix material 26 prior to removal of sacrificial fibre 28. In some embodiments, precursor 19 shown in FIG. 3 may be in a cured laminate form.

Layup 22 may comprise first face 22A and opposite second face 22B between which structural fibres 24 embedded in a cured matrix material 26 may be interposed. First face 22A may represent a top face of facing sheet 12 facing a source of noise and second face 22B may represent an opposite bottom face of facing sheet 12 facing backing plate 16. Sacrificial fibre 28 may extend across the thickness of layup 22 and through first face 22A and second face 22B.

Removable outer plies 20 may comprise a suitable release medium that is typically used during the manufacture of fibre-reinforced composite materials. Accordingly, removable outer plies 20 may be removably attached to layup 22. For example, removable outer plies 20 may be configured to not chemically bond to matrix material 26 so that it may be easily removed by peeling after curing of matrix material 26. For example, outer plies 20 may each comprise a cohesively formed plastic mesh comprising openings therethrough and that does not readily adhere to other polymers. Such openings may permit matrix material 26 to permeate therethrough during infusion of matrix material 24 (e.g., resin) into layup 22 of structural fibres 24. In some embodiments, removable outer plies 20 may each comprise a polytetrafluoroethylene (PTFE) coated fibreglass fabric of the type sold under the trade name RELEASE EASE. In some embodiments outer plies 20 may comprise a woven medium where the weave is porous and offers acceptable tear resistance that permits removal of outer plies 20 by peeling and also allows for shearing of sacrificial fibre 28. Arrows "P" illustrate the peeling of removable outer plies 20 from precursor 19.

In some embodiments, one of removable outer plies 20 may be of the type known as "wet" peel ply which can facilitate tacking onto a tool (e.g., mandrel, mold) that is used for preforming. In such cases the insertion of sacrificial fibre 28 into precursor 19 could be conducted after preforming.

Precursor 19 may be produced using known or other manufacturing methods suitable for producing fibre-reinforced structures. For example, precursor 19 may comprise pre-impregnated structural fibres 24 that are subsequently heated to cause bonding and curing of precursor 19. Alternatively or in addition, precursor 19 may comprise dry structural fibres 24 that are subsequently infused with matrix material 26 using a known or other resin infusion process (es) such as, for example, resin transfer infusion (RTI), resin transfer molding (RTM), vacuum-assisted resin transfer molding (VARTM), vacuum-assisted resin infusion (VARI), autoclave assisted resin infusion (AARI), single line injection (SLI), resin film infusion (RFI) and Seemann composites resin infusion molding process (SCRIMP). Such resin infusion process(es) may be conducted in or out of an autoclave. In some situations, it may be preferable to insert sacrificial fibre 28 through a precursor 19 that has dry structural fibres 24 as opposed to pre-impregnated structural fibres 24 because pre-impregnated structural fibres 24 may cause some of the matrix material 26 to build up on needles that are used during stitching.

Matrix material 26 may be of any known or other type suitable for producing fibre-reinforced structures. For example, matrix material 26 may have a curing/gel temperature (e.g., <150° C.) i.e., between B stage and C stage, that is lower than the melting temperature of sacrificial fibre 28. In various embodiments, matrix material 26 may comprise polyester, vinyl-ester, epoxy, benzoxanine and/or bismaleimide. Some matrix materials 26 having a good fire, smoke and toxicity (FST) properties may be suitable for "in cabin" transportation applications. For example, depending on the specific application and requirements, matrix material 26 may comprise one of the following products: product name T-PRIME 160 sold under the trade name GURIT; product name 337 sold under the trade name EPO-TEK; product name TOOLFUSION 3 sold under the trade name TYGA-VAC; product name RENLAM LY120 sold under the trade name HUNTSMAN; product names ARALDITE LY1564, ARALDITE FST 40002, ARALDITE FST 40003 and ARA-DUR 2594 sold under the trade name HUNTSMAN; product names CYCOM 890 and CYCOM 5250-4 sold under the trade name CYTEK; product names RTM 6 and RTM 651 sold under the trade name HEXCEL; product name EPON 862 sold under the trade name MOMENTIVE; product names LOCTITE BZ 9120 and LOCTITE BZ 9121 sold under the trade name HENKEL; and, product name BMI-1 sold under the trade name RAPTOR RESINS.

In some embodiments, sacrificial fibre 28 may be configured to evaporate at a temperature that is not otherwise detrimental to precursor 19. For example, sacrificial fibre 28 may comprise a thermoplastic aliphatic polyester. For example, sacrificial fibre 28 may comprise polylactic acid or polylactide (PLA) (e.g., 0.5 mm diameter and a melting temperature of about 160° C.) having the molecular formula $(C_3H_4O_2)_n$ and being a biodegradable thermoplastic aliphatic polyester derived from renewable resources, such as corn starch, tapioca roots, chips or starch, or sugarcane. For example, sacrificial fibre 28 may comprise one of: polyacrylamides, polyacrylates, acrylamide-dimethylaminoethyl acrylate copolymers, polyamines, polyethyleneimines, polyamidoamines and polyethylene oxide. In some embodiments, matrix material 26 may be cured/gelled to a level between the B stage and the C stage prior to removal of sacrificial fibre 28 so that the removal of sacrificial fibre 28 by evaporation may subsequently cause full curing of matrix material 26.

Alternatively, sacrificial fibre 28 may be configured to be dissolved using a solvent that is not otherwise detrimental to precursor 19. For example, sacrificial fibre 28 may be water-soluble. In some embodiments, sacrificial fibre may comprise one of: water soluble polyethylene oxide, hydrolysed cellulose acetate and polyvinyl alcohol.

Figure 4:
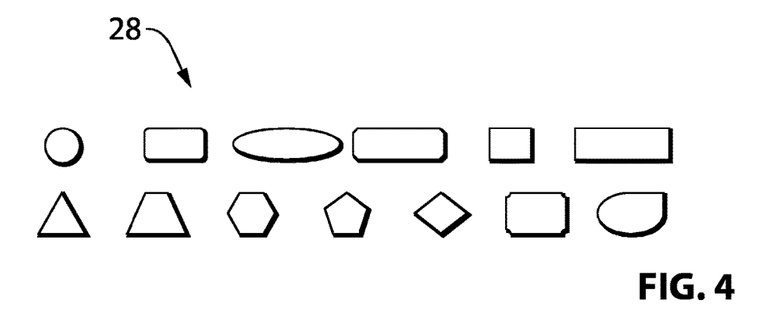
FIG. 4 illustrates exemplary cross-sectional shapes for a sacrificial fibre inserted into the precursor of FIG. 3.

FIG. 4 illustrates exemplary cross-sectional shapes for sacrificial fibre 28 inserted into precursor 19. Sacrificial fibre 28 may comprise a monofilament produced by extrusion. Sacrificial fibre 28 may have a generally circular or a non-circular cross-sectional profile. The maximum cross-sectional dimension (e.g., diameter) and shape of sacrificial fibre 28 may be generally equivalent to the size and shape of holes 18 to be formed in facing sheet 12 to achieve the desired acoustic performance. For example, in various applications, sacrificial fibre 28 may have a maximum cross-sectional dimension between about 0.08 mm to about 2 mm. In some embodiments, sacrificial fibre 28 may be part of a sacrificial yarn comprising a plurality of sacrificial fibres 28. Sacrificial fibre 28 may be in the form of a continuous monofilament or may be part of an assembly of continuous filaments in the form of a tow or twisted together. In some embodiments, sacrificial fibre 28 may be hollow.

Figure 5:
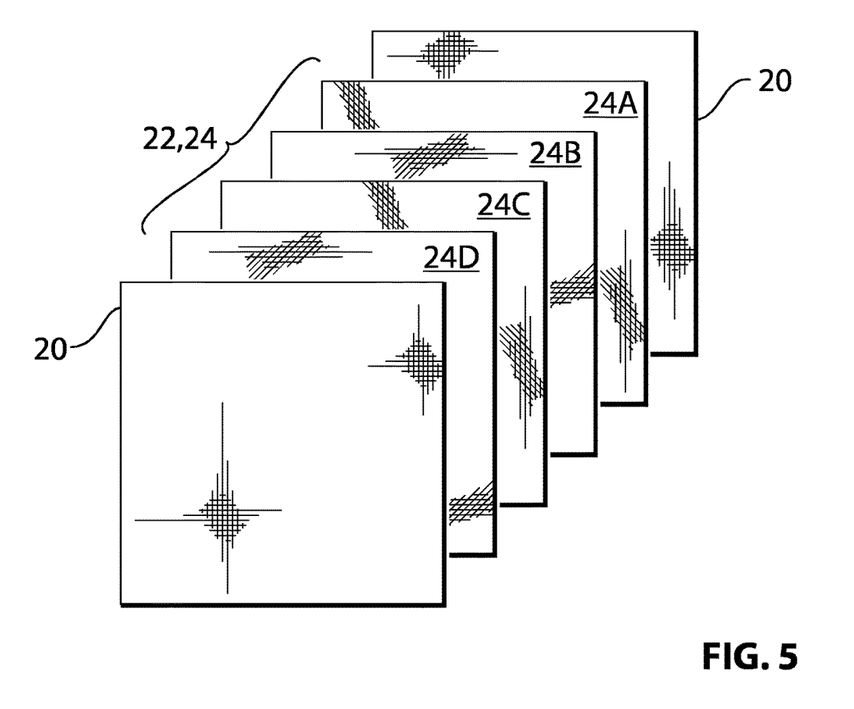
FIG. 5 is an exploded view of an exemplary layup of structural fibres and two removable outer plies of the precursor of FIG. 3.

FIG. 5 is an exploded view of an exemplary layup 22 of structural fibres 24 and removable outer plies 20 of the precursor 19 of FIG. 3. Layup 22 of structural fibres 24 may comprise a plurality of fabric plies 24A-24D. In some embodiments, one or more of fabric plies 24A-24D may comprise non-crimp fabric. Layup 22 may comprise additional or fewer fabric plies 24A-24D than those shown herein depending on the specific application and requirements. For example, plies 24A-24C of layup 22 may comprise 5 harness carbon weave plies having an architecture of 0/90, +/−0.45 and 0/90 respectively. Ply 24D may comprise one of: a 120 style fibreglass fabric; an uncured resin resurfacer; a fibreglass veil or fleece; a thermoplastic veil or fleece; a thermoplastic film that is substantially stable up to 200° C.; a thin (e.g., 0.002" or 0.05 mm) polyethersulfone (PES) film; a thin (e.g., 0.002" or 0.05 mm) polyethersulfone (PES) film; a thin (e.g., 0.002" or 0.05 mm) polyamides (PA) film; and, a thin (e.g., 0.002" or 0.05 mm) (PTFE) film. Ply 24D may be Corona (i.e., plasma) treated and may be clear or pigmented. Such treatment may provide additional UV and abrasion resistance and may in some applications eliminate the need for painting. Depending on the application ply 24D may not be required. In some applications, an additional ply of the same or similar construction to that of ply 24D may be disposed between ply 24A and removable outer ply 20.

The fabric in one or more of plies 24A-24D may be bindered with an un-catalysed epoxy powder or other powder compatible with matrix material 26 which may be activated at a preforming temperature (e.g., between 90° C. and 130° C.) which may be lower than the curing temperature. After preforming, layup 22 may be sufficiently solid and facilitate the introduction of sacrificial fibre 28 in precursor 19 by stitching as described below. Alternatively, sacrificial fibre 28 may be inserted into precursor 19 without requiring heating precursor 19 to activate the binder. In some embodiments, sacrificial fibre 28 may not comprise a weft nor a warp thread. Layup 22 and removable outer plies 20 may be assembled using a non-crimp fabric (NCF) machine sold under the trade names LIBA or KARL MAYER and stitched together using a warp knit, tufting or other stitch style/pattern using sacrificial fibre 28. The stitch style and density may be selected based on the handling ability of layup 22, the amount of perforation desired in facing sheet 12 and also the acoustic performance desired from facing sheet 12. Depending on the machine used, the stitch pattern (e.g., chain, tricot, modified tricot, blind stitching, tufting, warp-knitting, etc.), the frequency (e.g., courses per inch in the roll direction or 0° axis), and gauge (rows of stitching across the roll width) may be selected. In some embodiments, sacrificial fibre 28 may be inserted (e.g., stitched) in dry fabric plies 24A-24D.

Figure 6:
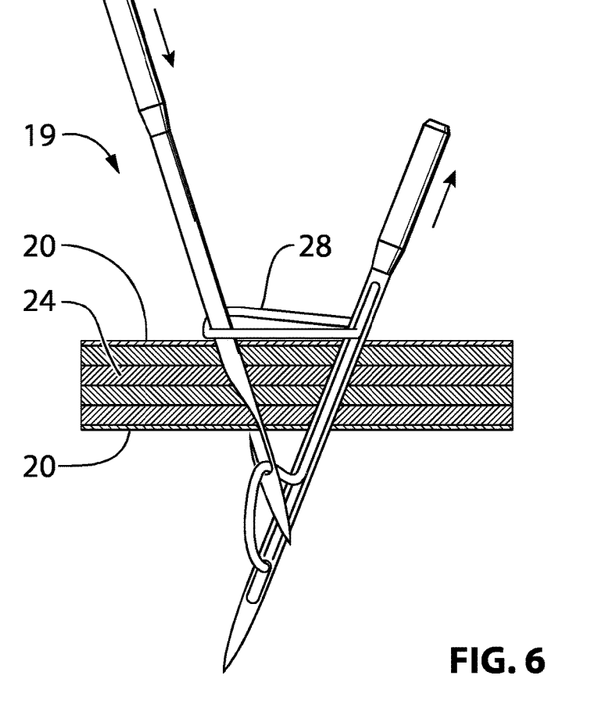
FIG. 6 illustrates the application of an exemplary stitch of a sacrificial fibre through removable outer plies and also through structural fibres of the precursor of FIG. 3.

FIG. 6 shows the application of a non-limiting exemplary stitch of sacrificial fibre 28 using stitching needles through both removable outer plies 20 and also through structural fibres 24 of precursor 19. The application of sacrificial fibre 28 by stitching may result in sacrificial fibre 28 being inserted between structural fibres 24 without damaging structural fibres 24. For example, the needles may deflect structural fibres 24 or yarns without breaking or otherwise damaging them in order to insert sacrificial fibre 28 therebetween. In this particular embodiment, both stitching needles may be manipulated from the same side of precursor 19. Using the stitching method shown in FIG. 6, the angle of sacrificial fibre 28 from normal axis A (shown in FIG. 2) may be varied between 0 degrees (e.g., parallel) from axis "A" to about 45 degrees from axis "A". The stitching method illustrated in FIG. 6 may also be referred to as "one side stitching".

Figure 7:
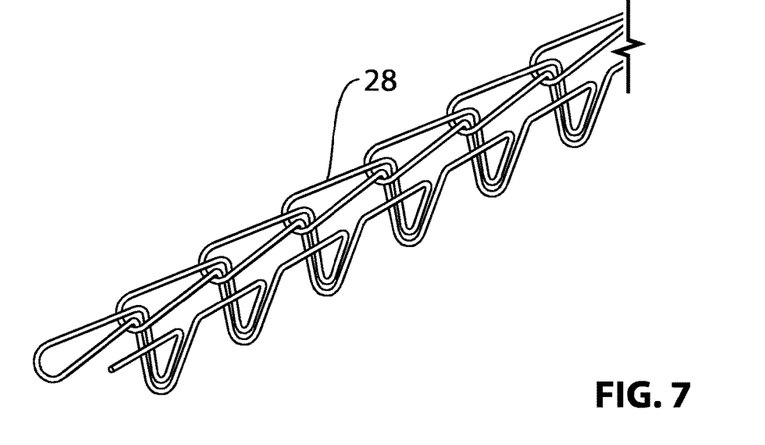
FIG. 7 is an axonometric view of the exemplary stitch of the sacrificial fibre applied in accordance with the stitching method illustrated in FIG. 6.

FIG. 7 is an axonometric view of an exemplary stitch of sacrificial fibre 28 obtained with the stitching method illustrated in FIG. 6.

Figure 8:
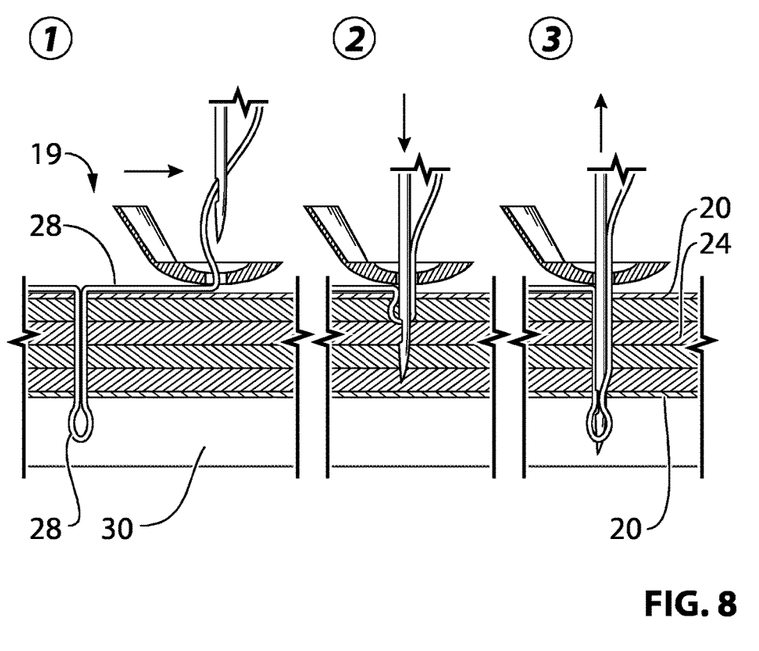
FIG. 8 illustrates the application of another exemplary stitch of a sacrificial fibre through removable outer plies and also through structural fibres of the precursor of FIG. 3.

FIG. 8 illustrates the application of another exemplary stitch of sacrificial fibre 28 through removable outer plies 20 and also through structural fibres 24 of precursor 19. The application of sacrificial fibre 28 is illustrated in three steps labeled as 1, 2 and 3. The stitching process illustrated in FIG. 8 may also be referred to as "tufting". A support foam backing 30 may be used for supporting precursor 19 during stitching and may permit the needle(s) to penetrate through the thickness of precursor 19 without damaging to the needles. Instead of support foam backing 30, a more rigid support structure having a slot to permit the passage of the needle(s) could be used.

Figure 9A:
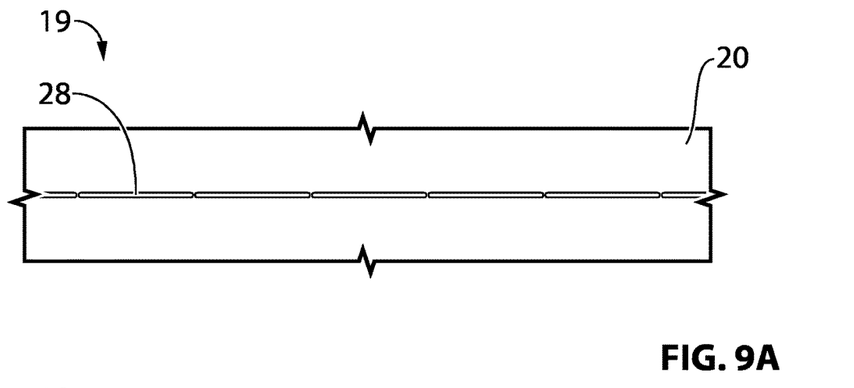
FIGS. 9A, 9B and 9C respectively show a top, a cross-sectional and a bottom view of the precursor of FIG. 3 comprising a sacrificial fibre stitched in accordance with the stitching method illustrated in FIG. 8.
Figure 9B:
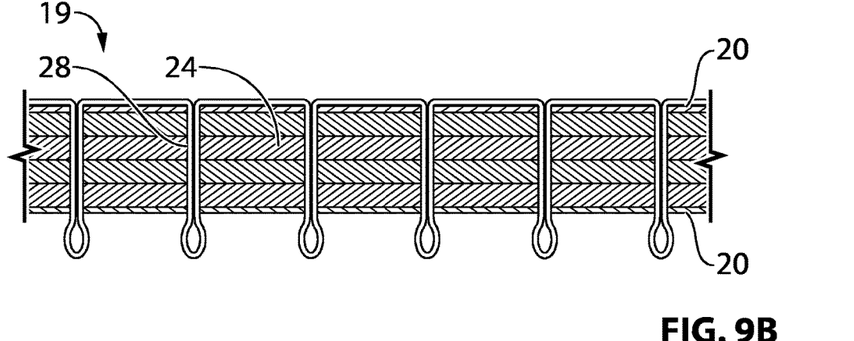
Figure 9C:
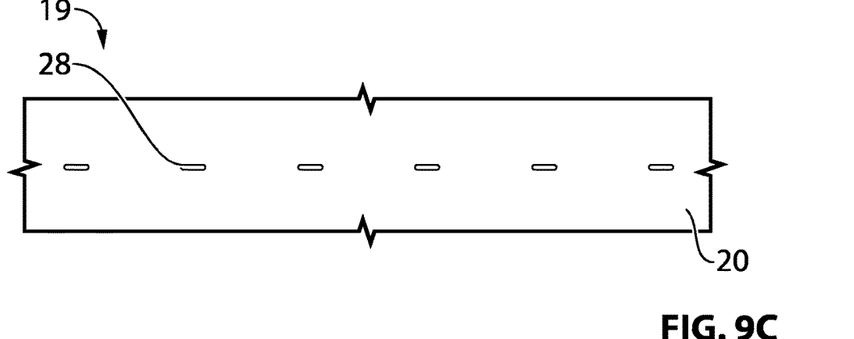

FIGS. 9A, 9B and 9C respectively show a top, a cross-sectional and a bottom view of precursor 19 comprising sacrificial fibre 28 that has been stitched in accordance with the stitching method illustrated in FIG. 8.

Figure 10:
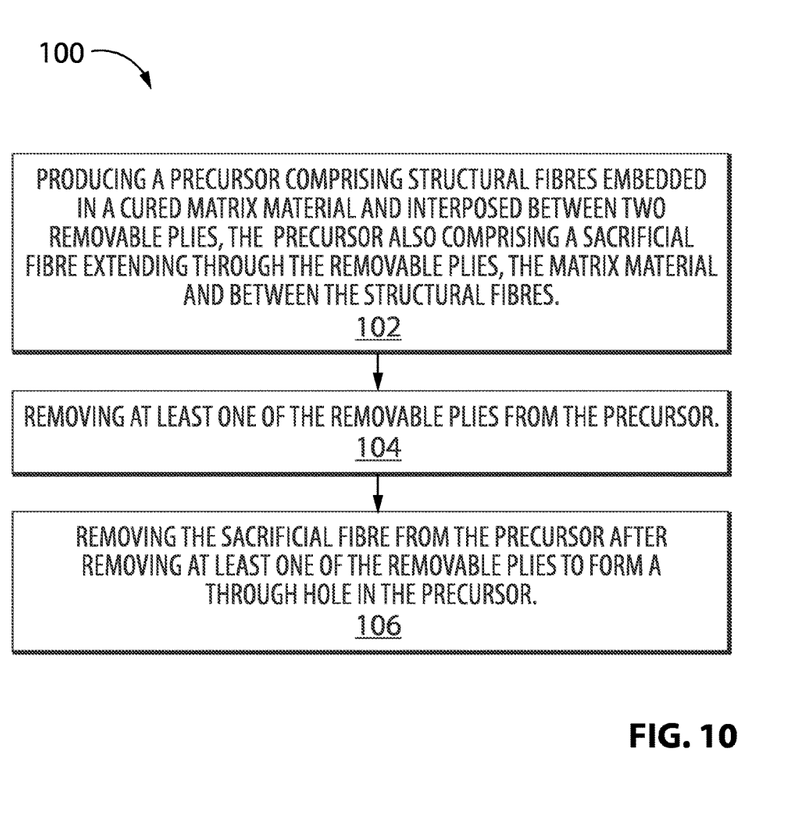
FIG. 10 is a flowchart illustrating a method for manufacturing the perforated composite facing sheet of the noise attenuating device of FIG. 1.

FIG. 10 is a flowchart illustrating an exemplary method 100 for manufacturing a perforated composite part such as composite facing sheet 12 of noise attenuating device 10. Method 100 may comprise producing and/or using precursor 19 as shown in FIG. 3. For example, in some embodiments, method 100 may comprise: producing precursor 19 comprising structural fibres 24 embedded in a cured matrix material 26 and interposed between two removable plies 20 where precursor 19 also comprises one or more sacrificial fibres 28 extending through removable plies 20, matrix material 26 and between structural fibres 24 (see block 102); removing at least one of the removable plies 20 from precursor 19 (see block 104); and removing sacrificial fibre(s) 28 from precursor 19 after removing the at least one of removable plies 20 to form one or more through holes 18 in precursor 19.

In some embodiments of method 100, it may be desirable to conduct non-destructing inspection (NDI) on precursor 19 before removing sacrificial fibre 28. For example, it may be desirable to conduct one or more NDI-related scans (e.g., ultrasound, radiography) on precursor 19 while there are no holes 18 in precursor 19 so that data obtained from such scan(s) may be easier to interpret.

Removing of sacrificial fibre 28 may comprise mechanically withdrawing sacrificial fibre 28 from precursor 19, melting sacrificial fibre 28 and evacuating sacrificial fibre 28, or, causing sacrificial fibre 28 to disintegrate (e.g., evaporation, dissolution).

As explained above, producing precursor 19 may comprise forming layup 22 comprising structural fibres 24 and infusing matrix material 26 (e.g., resin) between the structural fibres 24. Producing precursor 19 may also comprise inserting sacrificial fibre 28 into precursor 19 prior to infusing matrix material 26 between structural fibres 24.

Alternatively, instead of using a resin infusion process, structural fibres 24 that are used for producing precursor 19 may be pre-impregnated with matrix material 26 and heated to cause bonding and curing of precursor 19. In such case, sacrificial fibre 28 may be inserted between structural fibres 24 of precursor 19 prior to curing matrix material 26. Insertion of sacrificial fibre 28 between structural fibres 24 and through removable outer plies 20 may comprise known or other stitching techniques. For example, the insertion of sacrificial fibre 28 may comprise tufting and/or warp knitting. In some embodiments, the insertion of sacrificial fibre 28 into precursor 19 may be conducted in accordance with the teachings of U.S. Pat. No. 5,490,602, the entire contents of which being incorporated herein by reference.

Removable outer plies 20 may each comprise a release ply such as, for example, a polytetrafluoroethylene-coated fibreglass fabric/mesh or dry weaves of polyamide (nylon) or that are polyester treated so as to facilitate subsequent removal by peeling. In various embodiments, outer plies 20 may comprise light to heavy weight woven fabrics made of nylon or polyester. In some embodiments, outer ply(ies) 20 may comprise a nylon woven release fabric such as product number 60B or 60BR sold under the trade name TYGAVAC.

The removal of outer plies 20 may comprise peeling outer plies 20 away from structural fibres 24 and matrix material 26 as illustrated in FIG. 3 (see arrows P).

Since sacrificial fibre 28 may extend through the thickness of precursor 19 (e.g., through and between first surface 22A and second surface 22B) and through outer plies 20, the removal of outer plies 20 may cause severing of sacrificial fibre 28 so as to expose the ends of sacrificial fibre 28 (i.e., on each side across the thickness of precursor 19) and facilitate disintegration of sacrificial fibre 28. For example, since sacrificial fibre 28 may be stitched through removable outer plies 20, the removal of plies 20 may cause portions of sacrificial fibre 28 extending outside of layup 22 to be broken off from portions of sacrificial fibre 28 extending inside (i.e., through) layup 22. In some cases, sacrificial fibre 28 may be severed near or at first surface 22A and/or second surface 22B. Accordingly, removable outer plies 20 may also be referenced as fibre-severing members. The removal of outer plies 20 may also cause the removal of kinked, looped or knotted portions of sacrificial fibre 28 that may have been produced from the stitching process. Exposing the opposite ends of sacrificial fibre 28 by severing may facilitate the removal of sacrificial fibre 28 by evaporation or dissolution from both ends of sacrificial fibre 28 extending through layup 22.

Depending on the materials involved, the peeling of outer ply(ies) 20 may alternatively cause the complete removal of sacrificial fibre 28 from precursor 19 by causing sacrificial fibre 28 to be pulled out from precursor 19 and thereby eliminate the need for subsequent disintegration or evaporation of sacrificial fibre 28. In some embodiments, the use of a sacrificial fibre 28 of smaller diameter may facilitate the peeling of outer ply(ies) 20.

Instead of or in addition to removable outer plies 20, one or more other types of severing members may also be suitable for the purpose of severing sacrificial fibre 28 prior to the removal of sacrificial fibre 28 by evaporation, dissolution or other method. For example, a suitable severing member may comprise a severing fibre, yarn or cord engaged with sacrificial fibre 28 so that the removal of the severing fibre/yarn/cord may cause severing of sacrificial fibre 28. For example, such severing fibre/yarn/cord could be integrated with precursor 19 during the stitching of sacrificial fibre 28 or at some other time. In some embodiments, such severing member(s) could include some other material (e.g., in the form of a strip) that may be removably attached to precursor 19 for the purpose of causing severing of sacrificial fibre 28 when removed.

In any case, such severing member(s) may be removed manually or with the assistance of a suitable tool.

In some embodiments, it may be sufficient to only remove one of the two removable outer plies 20 prior to removing sacrificial fibre 28 from layup 22 by evaporation or dissolution. For example, evaporation or dissolution of sacrificial fibre 28 from a single end (i.e., from a single side of precursor 19) may be acceptable in some circumstances.

Disintegration of structural fibre 28 may cause the formation of one or more through holes 18 extending across the thickness of facing sheet 12. The thickness of facing sheet 12 as referenced herein may be considered along normal axis A of facing sheet 12 and/or precursor 19. However, as explained above, holes 18 may be oriented either substantially parallel to or at an angle from normal axis A. Holes 18 may follow the path formerly followed by sacrificial fibre 28 through precursor 19. In some embodiments, holes 18 may follow a substantially entirely linear path. Alternatively, in some embodiments, holes 18 could follow a curved path. In any case, holes 18 formed by the disintegration of sacrificial fibre 28 may be substantially high-fidelity replicas of the diameter and trajectory of sacrificial fibre 28.

In some embodiments, the disintegration of sacrificial fibre 28 may be conducted according to methods described in U.S. Pat. No. 5,490,602 and/or U.S. Patent Application Publication No. 2013/0065042 A1, the entire contents of both of which being incorporated herein by reference. Depending on the material of sacrificial fibre 28, disintegration of sacrificial fibre 28 may be conducted by evaporation or by dissolution. Evaporation of sacrificial fibre 28 may comprise heating precursor 19 to a temperature and duration that are sufficient to cause evaporation of sacrificial fibre 28 but that are not otherwise detrimental to structural fibres 24 or to matrix material 26. The evaporation process may comprise maintaining a sufficiently high temperature for a period of time sufficient to achieve satisfactory removal of sacrificial fibre 28. In order to accelerate the evaporation process, fluids (e.g., air) surrounding precursor 19 may be circulated to provide ventilation. Alternatively or in addition, precursor 19 may be enclosed in a vacuum bag during such evaporation and the bag may be continuously or intermittently evacuated during the evaporation.

Dissolution of sacrificial fibre 28 may comprise exposing precursor 19 to a solvent that causes dissolution of sacrificial fibre 28 but that is not otherwise detrimental to the structural fibres 24 or to matrix material 26. In some embodiments, sacrificial fibre 28 may be water-soluble. In some cases, a small amount of residue from sacrificial fibre 28 may remain inside of holes 18 and such residue may be removed using a flow of pressurized air or water for example.

In some embodiments, sacrificial fibre 28 may be coated with an agent that hinders a chemical reaction between sacrificial fibre 28 and matrix material 26. Such agent may comprise a suitable release agent or an inert elastomeric urethane, silicone or acrylic dip, liquid glass or a conformal barrier such as that sold under the trade name PARYLENE. The use of such agent may facilitate the removal of sacrificial fibre 28 by evaporation or dissolution. In some cases, the use of such agent may cause sacrificial fibre 28 to be entirely or partially pulled out from precursor 19 when removable outer plies 20 are peeled. In cases where sacrificial fibre 28 is not entirely removed from precursor 19 when peeling removable outer plies 20, it may be desirable to remove the remainder of sacrificial fibre 28 by evaporation or dissolution as described above.

Figure 11:
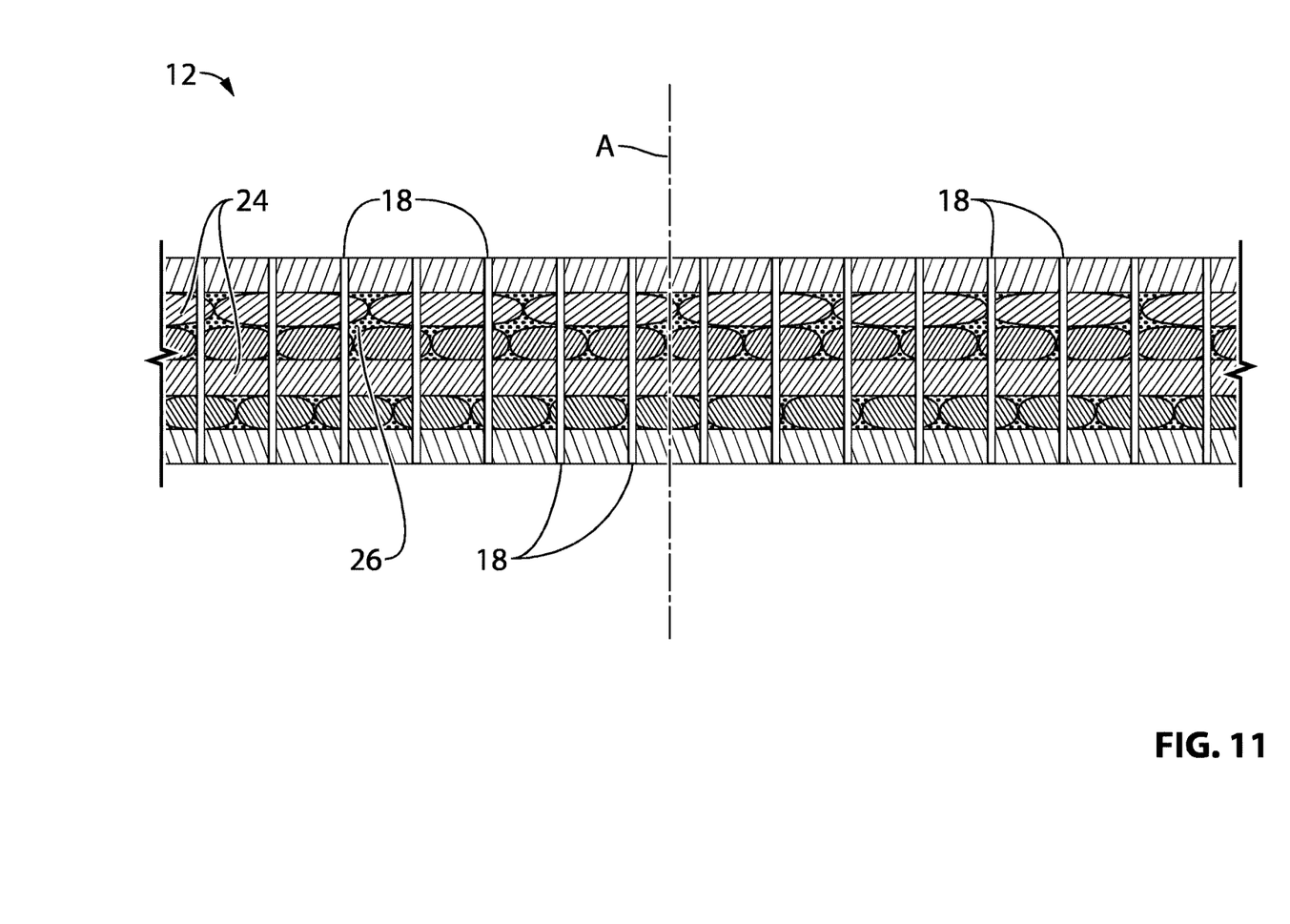
FIG. 11 is a schematic cross-sectional representation of an exemplary perforated composite facing sheet of the noise attenuating device of FIG. 1 manufactured in accordance with the method of FIG. 10.

FIG. 11 is a partial schematic cross-sectional representation of an exemplary perforated composite facing sheet 12 of the noise attenuating device 10 of FIG. 1 manufactured in accordance with the method 100 of FIG. 10 using precursor 19. FIG. 11 shows composite facing sheet 12 after matrix material 26 has been cured, removable plies 20 have been removed and sacrificial fibre 28 has been removed in order to form through holes 18. As explained below, holes 18 may extend through the thickness (i.e., across axis A) of facing sheet 12. Holes 18 may follow a substantially linear (straight) trajectory. Alternatively, holes 18 may follow a curved trajectory. Holes 18 may extend substantially parallel to axis A so as to follow the shortest path across the thickness of facing sheet 12. Alternatively, holes 18 may be oriented at an incline relative to axis A.

Figure 12:
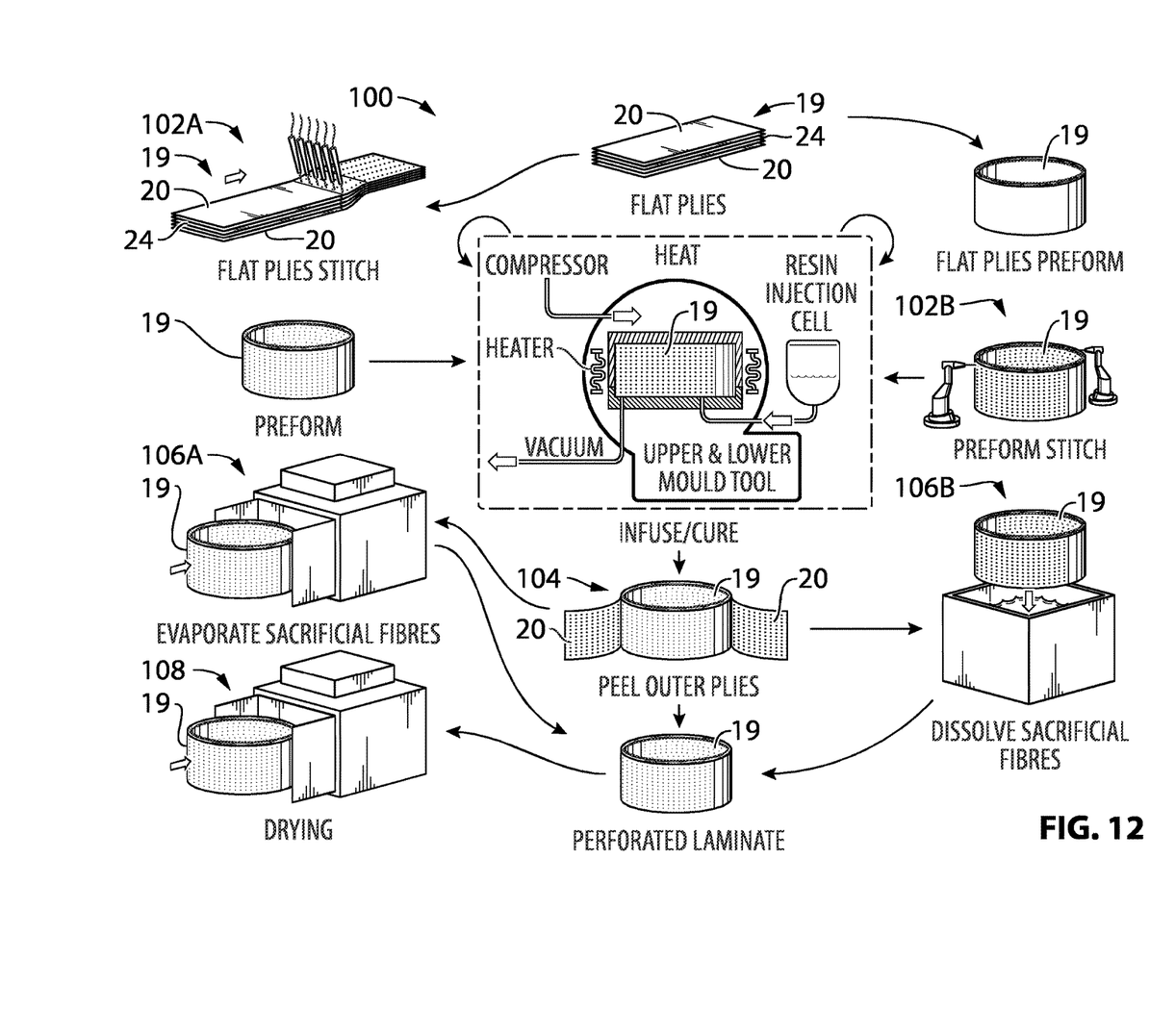
FIG. 12 is a flow diagram illustrating an exemplary embodiment of the method of FIG. 10.

FIG. 12 is a flow diagram illustrating an exemplary embodiment of the method 100 of FIG. 10. The top of FIG. 12 illustrates an embodiment of block 102 of method 100 where precursor 19 is produced. For example, the first (i.e., top) step in FIG. 12 shows flat plies of structural fibres 24 (i.e., see 24A-24D shown in FIG. 5) and removable outer plies 20 being overlaid. The insertion of sacrificial fibre 28 into precursor 19 by stitching may be conducted either before preforming (e.g., see 102A) or after preforming (e.g., see 102B). Reference numeral 102A illustrates that sacrificial fibre 28 may be inserted through the flat plies by stitching and precursor 19 may be subsequently preformed into a shape approximating the final shape of facing sheet 12. For example, precursor 19 may be preformed into a single-piece annular configuration after sacrificial fibre 28 has been stitched through the plies. Alternatively, reference numeral 102B shows that precursor 19 may be preformed into the single-piece annular configuration and sacrificial fibre 28 may be subsequently added to precursor 19 by stitching along a curved surface.

In some embodiments, depending on the type of material used as sacrificial fiber 28, it may be desirable to conduct the stitching at a temperature that temporarily softens the material of sacrificial fibre 28. The elevation of temperature during stitching may be particularly useful when a polymeric monofilament of relatively large diameter and stiffness is used as sacrificial fibre 28.

Reference numeral 104 illustrates the removal of one of removable outer plies 20 by peeling. As explained above, the removal of outer plies 20 (or other suitable fibre severing member) may cause severing of sacrificial fibre 28 as illustrated in FIG. 3 to expose one or more ends of sacrificial fibre 28.

In some embodiments, depending on the type of material used as sacrificial fiber 28, it may be possible to facilitate the peeling of outer plies 20 by first weakening sacrificial fibre 28 using a household clothes iron or any other suitable means of applying heat and/or pressure to sacrificial fibre 28. For example, a heated clothes iron may be pressed against the inner and/or outer sides of precursor 19 after the stitching of sacrificial fibre 28 through precursor 19. In the case of sacrificial fibre 28 being made of a polymer (or some other material that may be weakened by heat and/or pressure), the application of heat may weaken the molecular structure of the polymer. The application of pressure may also cause flattening of the portions of sacrificial fibre 28 extending across the inner and/or outer surfaces of precursor 19 thereby further weakening sacrificial fiber 28 and thereby facilitating shearing of sacrificial fibre 28 when outer ply (ies) 20 is/are subsequently peeled. Accordingly, the temperature of the clothes iron should be lower than the melting point of sacrificial fibre 28 but high enough to weaken the molecular structure of the material of sacrificial fibre 28. The ironing of sacrificial fibre 28 may be conducted after stitching but before preforming of precursor 19. Accordingly, the flattening of the portions of sacrificial fibre 28 extending across the inner and/or outer surfaces of precursor 19 may increase the area of sacrificial fibre 28 facing precursor 19 and thereby reduce the penetration of sacrificial fibre 28 into the inner/outer surfaces of precursor 19 during preforming. Accordingly, the flattening and/or weakening of sacrificial fibre 28 may reduce the indentation of precursor 19 caused by sacrificial fiber 28 during preforming.

After the removal of one or more of removable outer plies 20, sacrificial fibre 28 may be removed by evaporation (e.g., see 106A) or dissolution (e.g., see 106B). Reference numeral 106A shows that precursor 19 may then be heated in a ventilated heating chamber at a temperature and for a duration sufficient to achieve a desired amount of removal of sacrificial fibre 28 from precursor 19 by evaporation as explained above. Alternatively, reference numeral 106B shows that precursor 19 may be exposed to a solvent (e.g., water) for a duration suitable to achieve a desired amount of removal of sacrificial fibre 28 from precursor 19 by dissolution as explained above. In some embodiments, it may be desirable to heat and agitate the solvent to accelerate the dissolution of sacrificial fibre 28. In some embodiments using water as a solvent, it may be desirable to have the water heated to a temperature of around 95° C. during dissolution. In some embodiments, the water may be heated to a temperature between 90° C. and 95° C. In some embodiments, using water that is slightly alkaline or acidic may accelerate the dissolution of sacrificial fibre 28.

After sacrificial fibre 28 has been substantially removed from precursor 19, facing sheet 12 in the form shown in FIG. 11 may be obtained. Alternatively, precursor 19 may require subsequent processing in order to obtain a final and functional composite part. For example, reference numeral 108 illustrates a further step of drying precursor 19 after sacrificial fibre 28 has been substantially removed from precursor 19. Further processing of precursor 19 after the removable of sacrificial fibre 28 may not be necessary but in some cases drying of precursor 19 may be desired to remove the solvent from precursor 19 after dissolution of sacrificial fibre 28.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, while the devices, facing sheets, precursors and methods disclosed herein and shown herein may comprise a specific number of elements/steps, the devices, facing sheets, precursors and methods could be modified to include additional or fewer of such elements/steps. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for manufacturing a perforated composite part, the method comprising:
   producing a precursor comprising:
      a layup comprising structural fibers embedded in a curable matrix material and interposed between two removable plies; and
      a sacrificial fiber extending through the removable plies, the matrix material and between the structural fibers;
   removing at least one of the removable plies from the precursor, to cause severing of the sacrificial fiber; and
   removing the sacrificial fiber from the precursor after removing the at least one of the removable plies to form a through hole in the precursor at a location of the sacrificial fiber.

2. The method as defined in claim 1, wherein removing the sacrificial fiber comprises causing the sacrificial fiber to disintegrate.

3. The method as defined in claim 2, wherein removing at least one of the removable plies causes an end of the sacrificial fiber to become exposed to facilitate disintegration of the sacrificial fiber.

4. The method as defined in claim 1, wherein removing at least one of the removable plies causes severing of the sacrificial fiber.

5. The method as defined in claim 1, comprising removing the sacrificial fiber after removing both of the removable plies.

6. The method as defined in claim 1, wherein removing the sacrificial fiber comprises causing evaporation of the sacrificial fiber.

7. The method as defined in claim 1, wherein the sacrificial fiber comprises a thermoplastic aliphatic polyester.

8. The method as defined in claim 1, wherein the sacrificial fiber comprises a polylactide (PLA).

9. The method as defined in claim 1, wherein removing the sacrificial fiber comprises causing dissolution of the sacrificial fiber.

10. The method as defined in claim 9, wherein the sacrificial fiber comprises one of: polyacrylamides, polyacrylates, acrylamide-dimethylaminoethyl acrylate copolymers, polyamines, polyethyleneimines, polyamidoamines and polyethylene oxide.

11. The method as defined in claim 9, wherein the sacrificial fiber comprises one of: water soluble polyethylene oxide, hydrolysed cellulose acetate and polyvinyl alcohol.

12. The method as defined in claim 1, wherein the sacrificial fiber is coated with an agent that hinders a chemical reaction between the sacrificial fiber and the matrix material.

13. The method as defined in claim 1, wherein the structural fibers are part of a non-crimp fabric.

14. The method as defined in claim 1, wherein the removable plies comprise a polytetrafluoroethylene-coated fiberglass fabric.

15. The method as defined in claim 1, comprising peeling the removable plies from the precursor to cause severing of the sacrificial fiber.

* * * * *